United States Patent

Bardekoff

[11] 4,068,132
[45] Jan. 10, 1978

[54] WIND POWERED ELECTRICAL GENERATING PLANT

[76] Inventor: Abraham Bardekoff, 2965 Marion Ave., Bronx, N.Y. 10458

[21] Appl. No.: 674,629

[22] Filed: Apr. 7, 1976

[51] Int. Cl.$^2$ ............................................ F03D 11/04
[52] U.S. Cl. ........................................ 290/55; 290/44; 339/255 R
[58] Field of Search ................. 290/43, 44, 54, 55; 5/300; 415/4; 339/255 R, 255 A, 255 B, 255 L

[56] References Cited

U.S. PATENT DOCUMENTS

| | | | |
|---|---|---|---|
| 733,500 | 7/1903 | Moore | 5/300 |
| 1,936,233 | 11/1933 | Groves | 415/4 |
| 2,388,377 | 11/1945 | Albers | 290/55 |
| 2,431,111 | 11/1947 | Du Brie | 415/4 |

Primary Examiner—Robert K. Schaefer
Assistant Examiner—Michael K. Mutter
Attorney, Agent, or Firm—D. Paul Weaver

[57] ABSTRACT

A multi-level support structure contains plural power driven turntables on each level and each turntable carries a plurality of wind powered electrical generator units which are pivotally secured to the turntable and electrically coupled in a power distribution system through slip ring elements. Each generator unit has a rudder or wind vane causing the driving blades to face the wind. The generating units are readily removable from their turntable supports for repair and replacement by functioning units. The plant may be sized for commercial or home application.

4 Claims, 4 Drawing Figures

WIND POWERED ELECTRICAL GENERATING PLANT

BACKGROUND OF THE INVENTION

The world energy shortage and the increasing cost of electrical energy through conventional generating systems operated by oil or coal has given rise to a drastic need for alternate and supplementary sources of electrical power. Nature provides potentially limitless sources of energy in the motion of the seas and movement of winds, and the present invention is directed to the utilization of wind power for operating electrical generator means on a practical basis to supply electrical energy commercially or to individual homes, depending upon the size of the power plant embodying the present invention.

In terms of a commercial plant embodying the invention, it is thought to be feasible to generate sufficient energy at one plant to supply the needs of a small town or the needs of a city neighborhood. Such a power plant could also be useful to supplement the output of conventional utility plants during peak energy use periods, as in the summertime, when air conditioning causes severe overloading of existing systems, leading to possible brown-outs or black-outs.

The invention herein enables the utilization of natural winds or "apparent wind" resulting from the relative motion of moduluar power generating units on driven turntable supports in a multi-level power plant structure.

The invention may also be applicable in a broad sense to vehicular electrical power generation.

Other features and advantages of the invention will become apparent during the course of the following description.

BRIEF DESCRIPTION OF DRAWING FIGURES

DETAILED DESCRIPTION

Figure 1:
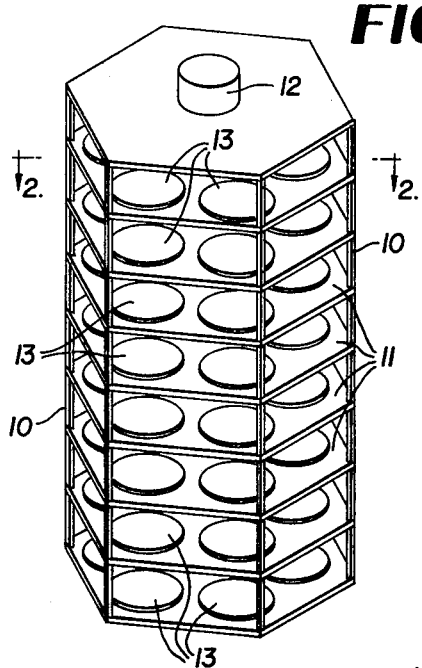
FIG. 1 is a perspective view of a wind powered electrical generating plant according to the invention.

Referring to the drawings in detail wherein like numerals designate like parts, a multi-level commercial electrical power plant is schematically shown in FIG. 1, and preferably being of hexagonal form and containing a feasible number of levels or floors, such as eight or ten. The plant structure can be fabricated from concrete with corner columns 10 supporting equidistantly spaced horizontal hexagonal floor slabs 11. The structure contains a central vertical service core 12 containing an elevator and other equipment to facilitate maintenance work and the removal and replacement of the modular generating units at required times.

Surrounding the service core 12 on each floor slab 11 of the plant are preferably six equidistantly spaced turntables 13 which are individually rotationally driven by any conventional power drive means, not shown in the drawings. The turntables have vertical axes of rotation and are horizontally disposed near and above their associated floor slabs 11.

Each turntable 13 is provided on its lower side with conducting slip rings 14 which slidably engage coacting slip rings 15 on each slab 11, forming elements of a power distribution system which otherwise may be conventional. The three slip ring arrangement shown is to adapt the plant to the transmission of three phase power.

Figure 2:
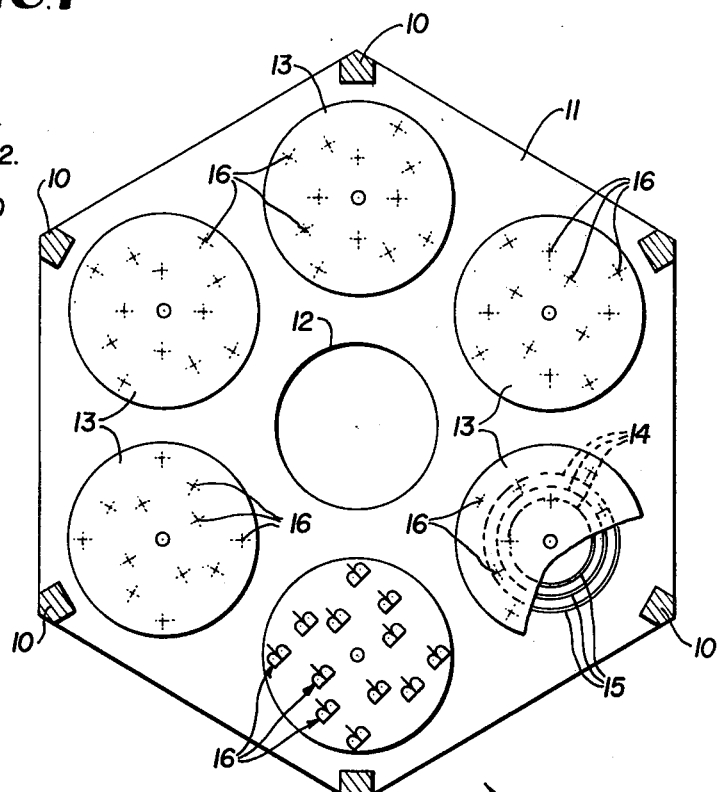
FIG. 2 is an enlarged, partly diagrammatic, horizontal cross section taken on line 2—2 of FIG. 1.
Figure 3:
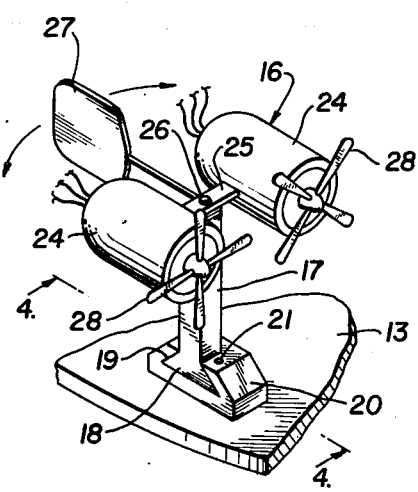
FIG. 3 is a perspective view of a power generating module or unit and its mounting base.
Figure 4:
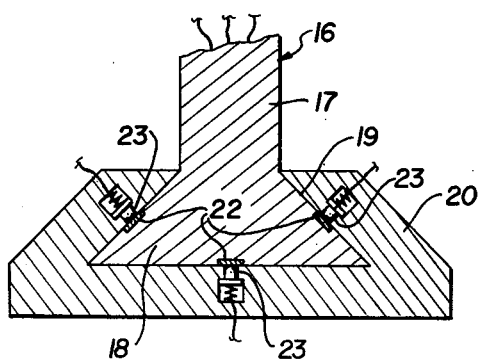
FIG. 4 is an enlarged vertical section taken on line 4—4 of FIG. 3 showing the pedestal of the generator unit, mounting base and associated spring loaded three phase contacts.

On each turntable 13 of each plant level are preferably twelve electrical power generating units 16, one such unit being shown in detail in FIG. 3. On each turntable 13, as shown in FIG. 2, the generating units 16 are arrayed so that their driving blades may face the wind. Each generating unit 16 comprises a mounting pedestal 17 having an integral dovetailed base 18 adapted to be releasably coupled in a dovetailed groove 19 of a mounting base 20 fixed to the turntable or disc 13. The elements 18 and 20 may be coupled by a removable locking pin 21, FIG. 3, or by equivalent means.

Each mounting base 20 and coacting member 18 are equipped with spring loaded electrical contacts 22 and 23 for the three phase power generating system. The contacts 23 on base 20 are wired to conductors which are embedded in the turntables 13, not shown, and which embedded conductors are electrically connected with turntable slip rings 14 to maintain the integrity of the transmission system. Similarly, the contacts 22 are electrically coupled through embedded conductors in the pedestals 17, not shown, with output electrical terminals of the twin generators 24 which are included in each modular removable unit 16.

The two generators 24 of each unit 16 are secured to a common cross arm 25 pivoted by a vertical axis pivot element 26 to the top of the pedestal 17, whereby the two generators 24 may be adjusted horizontally about the axis of pivot element 26 by an attached rudder or wind vane 27, one for each unit 16. The generators 24 (or alternators) are powered by suitably sized rotational blades 28 which face into the real or apparent wind at all times and are driven by the wind. The electrical outputs of the generators 24 are delivered through conductors, not shown, in the pedestals 17 to the contacts 22 and 23 and to embedded conductors in the bases 20 which are electrically coupled to the turntable slip rings 14.

Whenever there is a break-down or difficulty with one of the generating units 16, its particular turntable 13 may be temporarily stopped, without stopping any of the other turntables, and the effected unit 16 may be quickly removed from the base or holder 20 and replaced by a functioning unit.

When a natural wind is available, the turntables 13 are not rotationally driven and the units 16 are properly steered into the face of the wind by the rudders 27. The number and size of generator units and the number of turntables 13 and their size, as well as the number of levels 11 in the plant, may be varied within the invention.

The wind powered blades 28 of the generators may be of a variable pitch design and self-feathering to accommodate variations in wind velocity, sudden gusts, storms and the like.

The utility and practicality of the invention should be readily apparent to those skilled in the art in light of the foregoing disclosure.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. In a wind powered electrical generating plant, supporting means having power distributing electrical conductor means, a mounting base fixed on the supporting means and having a dovetail socket, spring urged contacts on the mounting base electrically coupled with said electrical conductor means and being in communication with said dovetail socket, a pedestal having a dovetail base engageable removably in said dovetail socket, electrical contact elements in spaced relation on faces of said dovetail base and abutting said spring urged contacts of said mounting base when the dovetail base is disposed in said dovetail socket of the mounting base, at least one wind driven electrical generator rotatably mounted on said pedestal and having a connected rudder causing said generator to face into the wind, and conductor means in said pedestal electrically coupled with terminals of said generator and with said electrical contact elements.

2. In a wind powered electrical generating plant as defined in claim 1, and said socket having an open end and a closed end, whereby said dovetail base can slidably engage within said socket and be accurately positioned therein by engagement with said closed end so that the spring urged contacts are aligned with said electrical contact elements.

3. In a wind powered electrical generating plant as defined in claim 1 and a pair of wind driven electrical generators on said pedestal, a cross arm supporting said generators in side-by-side relation and being rotatably connected to the top of the pedestal, and said rudder secured to said cross arm.

4. In a wind powered electrical generating plant as defined in claim 1 and said supporting means comprising a multi-level supporting means including spaced superposed support slabs, said slabs having said power distributing electrical conductor means thereon.

* * * * *